United States Patent
Takamori et al.

[11] Patent Number: 5,830,095
[45] Date of Patent: Nov. 3, 1998

[54] SPROCKET AND MANUFACTURING METHOD THEREOF

[75] Inventors: Norihiko Takamori, Kyoto; Fumihiko Metsugi, Shiga; Akihito Ohata, Shiga; Akihito Yoshiie, Shiga; Shunji Takeda, Shiga, all of Japan

[73] Assignees: Sunstar Engineering Inc., Osaka, Japan; Uni-Sunstar B.V., Amsterdam, Netherlands

[21] Appl. No.: 849,660

[22] PCT Filed: Nov. 22, 1995

[86] PCT No.: PCT/JP95/02383

§ 371 Date: May 19, 1997

§ 102(e) Date: May 19, 1997

[87] PCT Pub. No.: WO96/17094

PCT Pub. Date: Jun. 6, 1996

[30] Foreign Application Priority Data

Nov. 25, 1994 [JP] Japan .................................. 6-291504

[51] Int. Cl.$^6$ .................................................. F16H 55/30
[52] U.S. Cl. ............................................. 474/152; 29/892
[58] Field of Search .................................. 474/152, 892, 474/893.32, 893.33, 893.37

[56] References Cited

U.S. PATENT DOCUMENTS

| | | | |
|---|---|---|---|
| 2,931,094 | 4/1960 | Teerlink | 474/152 |
| 3,745,851 | 7/1973 | Zeldman et al. | 474/152 |
| 3,796,106 | 3/1974 | Fisher et al. | 474/152 |
| 4,527,987 | 7/1985 | Berchem | 474/152 |
| 5,310,432 | 5/1994 | Fukui et al. | 148/330 |

FOREIGN PATENT DOCUMENTS

| | | |
|---|---|---|
| 3244361 | 11/1983 | Germany . |
| 4321477 | 1/1994 | Germany . |
| 2133527 | 5/1990 | Japan . |
| 557887 | 6/1946 | United Kingdom . |

*Primary Examiner*—Thomas R. Hannon
*Attorney, Agent, or Firm*—Sughrue, Mion, Zinn, Macpeak & Seas, PLLC

[57] ABSTRACT

A sprocket made of low carbon steel of not more than 0.25 wt % in the carbon content comprising teeth portion which are quenched to a hardness close to the theoretical maximum quenching hardness of 35–55 Rockwell hardness C, and an inside diameter mounting hole.

8 Claims, 8 Drawing Sheets

OUTSIDE DIAMETER FINISH PUNCHING PROCESS

INSIDE DIAMETER CORE PUNCHING PROCESS

PATTERN HOLE PUNCHING PROCESS

INSIDE DIAMETER MOUNTING HOLE FINISH PUNCHING PROCESS

TEETH CUTTING PROCESS

TEETH QUENCHING PROCESS

SURFACE TREATMENT PROCESS

OUTSIDE DIAMETER FINISH PUNCHING PROCESS (PRESS FORMING)

INSIDE DIAMETER CORE PUNCHING PROCESS (PRESS FORMING)

PATTERN HOLE PUNCHING PROCESS (PRESS FORMING)

OUTSIDE DIAMETER CUTTING PROCESS (MACHINING)

INSIDE DIAMETER CUTTING PROCESS

TEETH CUTTING PROCESS (MACHINING)

TEETH QUENCHING PROCESS
(HIGH FREQUENCY QUENCHING)

MOUNTING HOLE DRILLING PROCESS
(MACHINING)

MOUNTING HOLE CHAMFERING
PROCESS (MACHINING)

SURFACE TREATMENT PROCESS
(PLATING)

SPROCKET AND MANUFACTURING METHOD THEREOF

TECHNICAL FIELD

The present invention relates to a sprocket made of low carbon steel, the carbon content of which is not more than 0.25 wt %, and a manufacturing method thereof.

BACKGROUND ART

Conventionally, carbon steel of which the carbon content is 0.40 to 0.50 wt % (referred to as medium carbon steel in this specification hereinafter), for example, carbon steel of S45C stipulated in JIS is used for a sprocket to transmit power in a motorcycle.

The process of manufacturing a sprocket includes, for example, 15 processes of (a) to (j) as shown in FIGS. 7 and 8. When the teeth portion of a sprocket undergo a heat-treatment in the teeth portion quenching process shown in FIG. 8(g), hardness of the teeth portion is set at 35 to 50 of the Rockwell hardness C, so that the anti-abrasion property can be enhanced.

On the other hand, there is provided a sprocket made of carbon steel, the carbon content of which is not more than 0.25 wt % (referred to as low carbon steel in this specification hereinafter), for example, low carbon steel of SPH to S20C stipulated in JIS. The above sprocket is used in some regions because a plate of low carbon steel is inexpensive.

It is well known that even the hardness of low carbon steel is somewhat increased when it is heated to a temperature not lower than the $A_3$ transformation point and then dipped in water so as to be quenched. There is provided a sprocket, the teeth portion of which undergo a heat treatment so that the hardness can be increased. However, when the matter is considered from an essential viewpoint, it is impossible to quench low carbon steel, and it is difficult to sufficiently increase the hardness of low carbon steel.

In the case of a sprocket made of medium carbon steel, it is possible to sufficiently increase the hardness of the teeth portion. Therefore, the sprocket made of medium carbon steel is excellent in the anti-abrasion property. However, the material cost of medium carbon steel is high, and further distortions and cracks tend to occur in the process of press forming since the hardness is high. Due to the above characteristic of medium carbon steel, it is difficult to manufacture a sprocket mainly by means of press forming. Therefore, it is necessary to conduct machining in the five essential manufacturing processes including an outside diameter cutting process, inside diameter cutting process, teeth cutting process, mounting hole drilling process and mounting hole chamfering process. Since the number of processes is increased, the manufacturing cost is high. Further, a large quantity of chips are produced in the process of machining, and it is complicated to remove the produced chips. Furthermore, due to the abrasion of a cutting tool, errors tend to occur in the manufacturing process. Accordingly, it is necessary to pay close attention in order to stabilize the machining accuracy when the sprocket is manufactured.

On the other hand, in the case of a sprocket made of low carbon steel, the following advantages are provided. The material cost is reduced. Due to the characteristic of low carbon steel, no distortions are generated in the process of press forming. Therefore, it is not necessary to machine after-processing such as finishing. Accordingly, it is possible to manufacture a sprocket mainly by means of press forming. Further, the manufacturing process of a sprocket made of low carbon steel is simpler than that of a sprocket made of medium carbon steel. Therefore, the manufacturing cost can be greatly reduced. In spite of the above advantages, the sprocket made of low carbon steel is disadvantageous in that it is impossible to provide a sufficiently high hardness and further the anti-abrasion property is greatly deteriorated.

DISCLOSURE OF THE INVENTION

The present invention has been accomplished by the inventors who discovered that even the hardness of low carbon steel can be increased to a value close to the theoretical maximum quenching hardness when it is cooled more quickly than it is cooled being dipped in water. It is an object of the present invention to provide a sprocket to be manufactured at low cost, the anti-abrasion property of which is high. Also, it is an object of the present invention to provide a method of manufacturing the sprocket.

According to the first aspect, the present invention is to provide a sprocket made of low carbon steel, the carbon content of which is not more than 0.25 wt %, and the teeth portion of which are quenched to a hardness close to the theoretical maximum quenching hardness.

According to the second aspect, the present invention is to provide a sprocket in which the teeth portion are quenched to 35 to 55 of the Rockwell hardness C.

According to the third aspect, the present invention is to provide a sprocket in which the carbon content is set at 0.10 to 0.20 wt %.

According to the fourth aspect, the present invention is to provide a sprocket in which a ratio of the shearing surface to the inner circumferential surface of the inside diameter mounting hole is not less than 50%.

According to the fifth aspect, the present invention is to provide a method of manufacturing a sprocket comprising the steps of: machining a low carbon steel plate, the carbon content of which not more than 0.25 wt %, into a shape of a sprocket; and quenching the teeth portion of the machined sprocket heating to a temperature not lower than the $A_3$ transformation point and quickly cooling to a temperature lower than 500° C. within 0.5 sec so as to quench the teeth portion to a hardness close to the theoretical maximum quenching hardness.

According to the sixth aspect, the present invention is to provide a method of manufacturing a sprocket in which the carbon content of a low carbon steel plate is set at 0.10 to 0.20 wt %.

According to the seventh aspect, the present invention is to provide a method of manufacturing a sprocket in which the teeth portion are quenched to 35 to 55 of the Rockwell hardness C.

According to the eighth aspect, the present invention is to provide a method of manufacturing a sprocket in which the teeth portion of the machined sprocket are heated to a temperature not lower than the $A_3$ transformation point and watered by jet simultaneously with or immediately after the stoppage of heating in the quenching process so as to quench the teeth portion.

According to the ninth aspect, the present invention is to provide a method of manufacturing a sprocket in which the teeth portion of the machined sprocket are heated to a temperature not lower than the $A_3$ transformation point and watered by jet immediately before the stoppage of heating in the quenching process so as to quench the teeth portion.

According to the tenth aspect, the present invention is to provide a method of manufacturing a sprocket in which a shape of the sprocket is formed from a low carbon steel plate only by means of press forming in the manufacturing process.

According to the eleventh aspect, the present invention is to provide a method of manufacturing a sprocket in which at least the teeth portion of the sprocket are machined in the manufacturing process.

According to the twelfth aspect, the present invention is to provide a method of manufacturing a sprocket in which the teeth portion of the sprocket are heated by a high-frequency induction heating device in the quenching process.

According to the present invention, a sprocket is made of low carbon steel, the carbon content of which is not more than 0.25 wt %, and the teeth portion of this sprocket are quenched to a hardness close to the theoretical maximum quenching hardness. Accordingly, while the sprocket is composed of inexpensive low carbon steel, the anti-abrasion property of the teeth portion of the sprocket can be enhanced as highly as possible.

In this case, when a sprocket is made of low carbon steel, the carbon content of which is 0.10 to 0.20 wt %, the sprocket can be manufactured from a common inexpensive material while maintaining the anti-abrasion property of the teeth portion to be sufficiently high. When the teeth portion are quenched to 35 to 55 of the Rockwell hardness C, it is possible to maintain the anti-abrasion property of the teeth portion to be sufficiently high. Further, when a ratio of the shearing surface to the inner circumferential surface of the inside diameter mounting hole is set at a value not less than 50%, the sprocket can be highly accurately assembled to a rotary shaft attached to the inside diameter mounting hole.

According to the method of manufacturing a sprocket of the present invention, first, in the manufacturing process, a low carbon steel plate of which the carbon content is not more than 0.25% is formed into a shape of the sprocket, and in the next quenching process, the teeth portion of the sprocket are heated to a temperature not lower than the $A_3$ transformation point and then quickly cooled to a temperature not higher than 500° C. within 0.5 sec. In this way, the sprocket can be provided. When the teeth portion are quickly cooled and quenched from a temperature not lower than the $A_3$ transformation point to a temperature not higher than 500° C. within 0.5 sec, the Rockwell hardness C of the teeth portion can be set at a value close to the theoretical maximum quenching hardness.

In this case, when the carbon content of a low carbon steel plate is set at 0.10 to 0.20 wt %, the sprocket can be manufactured from a common inexpensive material while maintaining the anti-abrasion property of the teeth portion to be sufficiently high. When the teeth portion are quenched to 35 to 55 of the Rockwell hardness C, it is possible to maintain the anti-abrasion property of the teeth portion to be sufficiently high. Further, when the teeth portion of the sprocket are heated to a temperature not lower than the $A_3$ transformation point and watered by jet so as to be quenched simultaneously with or immediately after the stoppage of heating, it is possible to quickly cool and quench the teeth portion to a temperature not higher than 500° C. within 0.5 sec. When the teeth portion are watered by jet and cooled immediately before the stoppage of heating, it is possible to prevent the occurrence of a gentle drop of temperature which is caused in a period of time from the stoppage of heating to the start of jet-watering the teeth portion. Accordingly, it is possible to further increase the cooling speed of the teeth portion to be quenched.

Since the sprocket is made of low carbon steel, the carbon content of which is low, it is possible to form a low carbon steel sheet into a shape of the sprocket only by means of press forming such as fine blanking. Accordingly, while the manufacturing process of the sprocket is simplified, a highly accurate sprocket of high quality can be manufactured.

Further, when the teeth portion of the sprocket are heated by the high-frequency induction heating device in the quenching process, only the teeth portion can be quickly heated to a predetermined temperature.

BRIEF DESCRIPTION OF DRAWINGS

FIGS. 3(a) through 3(i) are manufacturing process drawing of the sprocket.

BEST MODE FOR PRACTICING INVENTION

Referring to the accompanying drawings, an embodiment of the present invention will be explained as follows.

Figure 1:
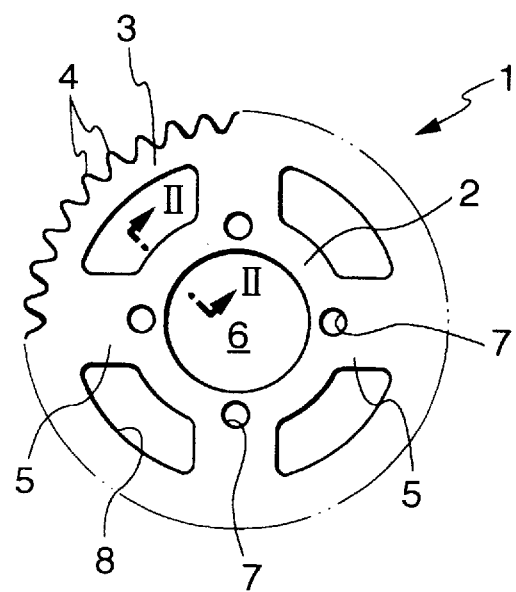
FIG. 1 is a plan view of the sprocket.

As shown in FIG. 1, the sprocket 1 includes: an annular boss 2 formed in the center; an annular rim 3 formed on the outer circumference; a plurality of teeth 4 formed on the outer circumference of the rim 3; four arms 5 connecting the boss 2 with the rim 3; an inside diameter mounting hole 6 through which an output shaft of an engine is inserted; four attaching holes 7 to which the bolts for fixing the sprocket 1 to the output shaft are attached; and four pattern holes 8 for the reduction of the weight. Although the above common sprocket 1 is used in this embodiment, sprockets of different structures may be adopted.

Figure 5:
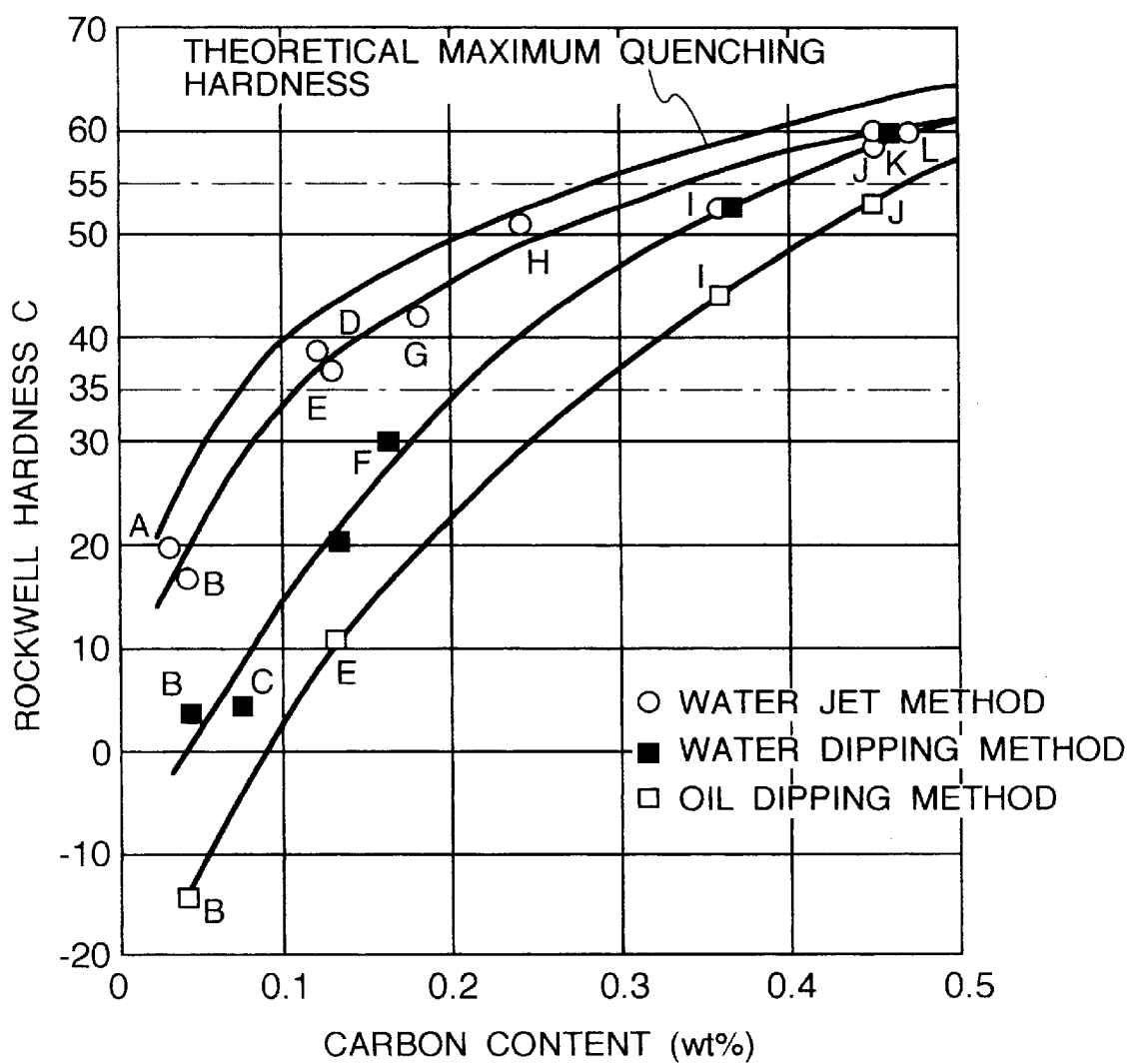
FIG. 5 is a diagram showing the quenching hardness and others.

The sprocket 1 is made of low carbon steel, the carbon content of which is not higher than 0.25 wt %, and preferably 0.10 to 0.2 wt %. Concerning the upper limit of the carbon content, when the upper limit is set at a value higher than 0.25 wt %, the material cost is high although a sufficiently high hardness can be provided. Accordingly, the upper limit is set at a value not higher than 0.25 wt %. In order to reduce the material cost as low as possible, it is preferable to set the upper limit at a value not higher than 0.2 wt %. Concerning the lower limit of the carbon content, when the carbon content is reduced to a value lower than 0.10 wt % as shown in FIG. 5, even the theoretical maximum quenching hardness is reduced to a value not higher than 35 of the Rockwell hardness C, and it is impossible to provide a sufficiently high anti-abrasion property. Therefore, the lower limit is set at a value not lower than 0.10 wt %.

Figure 2:
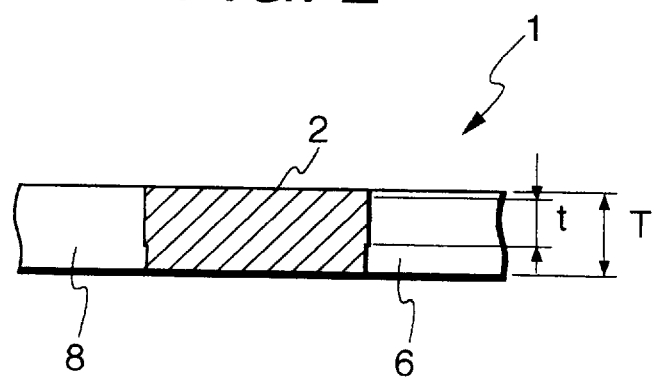
FIG. 2 is a cross-sectional view taken on line II—II in FIG. 1.

As described above, the carbon content of the sprocket 1 is low, it is possible to manufacture the sprocket 1 through a manufacturing process mainly composed of press forming. As shown in FIG. 2, a ratio 100×(t/T) of the shearing surface to the inner circumferential surface of the inside diameter mounting hole 6 is set at a value not less than 50%, so that the assembling accuracy with respect to the output shaft can be enhanced.

Next, referring to the manufacturing process diagram shown in FIG. 3, the manufacturing process of the sprocket 1 will be explained as follows.

Figure 3A:
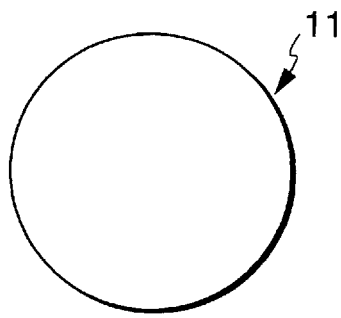

First, in the outside diameter finish punching process shown in FIG. 3(a), a low carbon steel plate, the carbon content of which is 0.10 to 0.25 wt %, is punched, and the first disk-shaped step 11 is made.

Figure 3B:
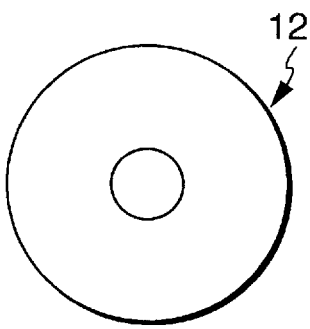

Next, in the inside diameter core punching process shown in FIG. 3(b), a center of the first step 11 is punched, and the second step 12 is made.

Figure 3C:
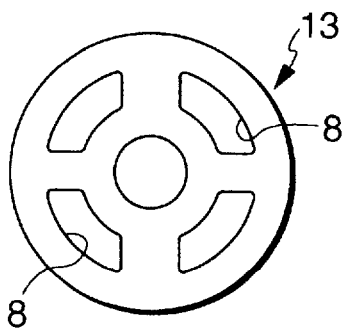

Next, in the pattern hole punching process shown in FIG. 3(c), pattern holes 8 are punched on the second step 12 by means of press forming, and the third step 13 is made.

Figure 3D:
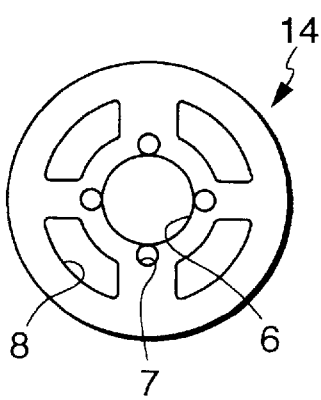

Next, in the inside diameter mounting hole finish punching process shown in FIG. 3(d), a center of the step is punched by means of press forming, and the inside diameter mounting hole 6 is formed, and at the same time, four attaching holes 7 are punched, and the fourth step 14 is made. When a clearance between the punch and the die is set at a value not higher than 5% at this time, punching is conducted in such a manner that the ratio of the shearing surface to the inner circumferential surface of the inside diameter mounting hole 6 is maintained at a value not lower than 50%.

Figure 3E:
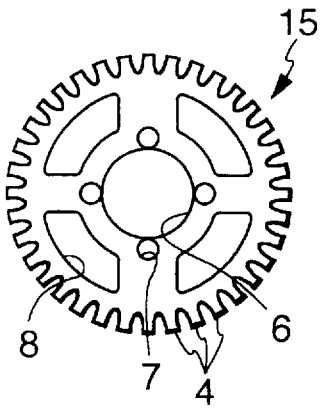

Next, in the teeth cutting process shown in FIG. 3(e), a plurality of teeth 4 are formed on the outer circumference of the fourth step 14 by means of machining, and the fifth step 15 is made. In this connection, this teeth cutting process may be conducted by means of press forming. In the case of press forming, it is preferable to provide a burr removing process after the teeth cutting process.

Figure 3F:
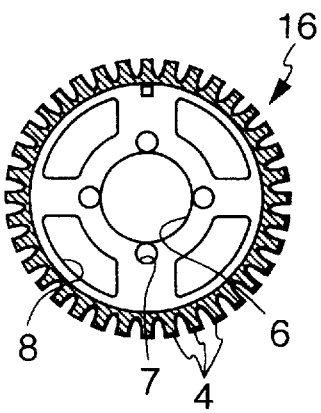

Next, in the teeth quenching process shown in FIG. 3(f), the teeth 4 are heated to a temperature not lower than the $A_3$ transformation point (for example, not lower than 870° C.) with a high-frequency induction heating device 21 described later, and simultaneously with the stoppage of heating, the teeth 4 are watered by jet so that the teeth 4 can be quenched. In this way, the sixth step 16 is obtained. In this connection, the teeth 4 may be watered by jet immediately after the stoppage of heating so that the teeth 4 can be quenched.

At this time, the teeth 4 are quickly cooled to a temperature not higher than 500° C. within 0.5 sec, and the Rockwell hardness C of the teeth is adjusted to a value in a range from 35 to 55 which is close to the theoretical maximum hardness.

Figure 6:
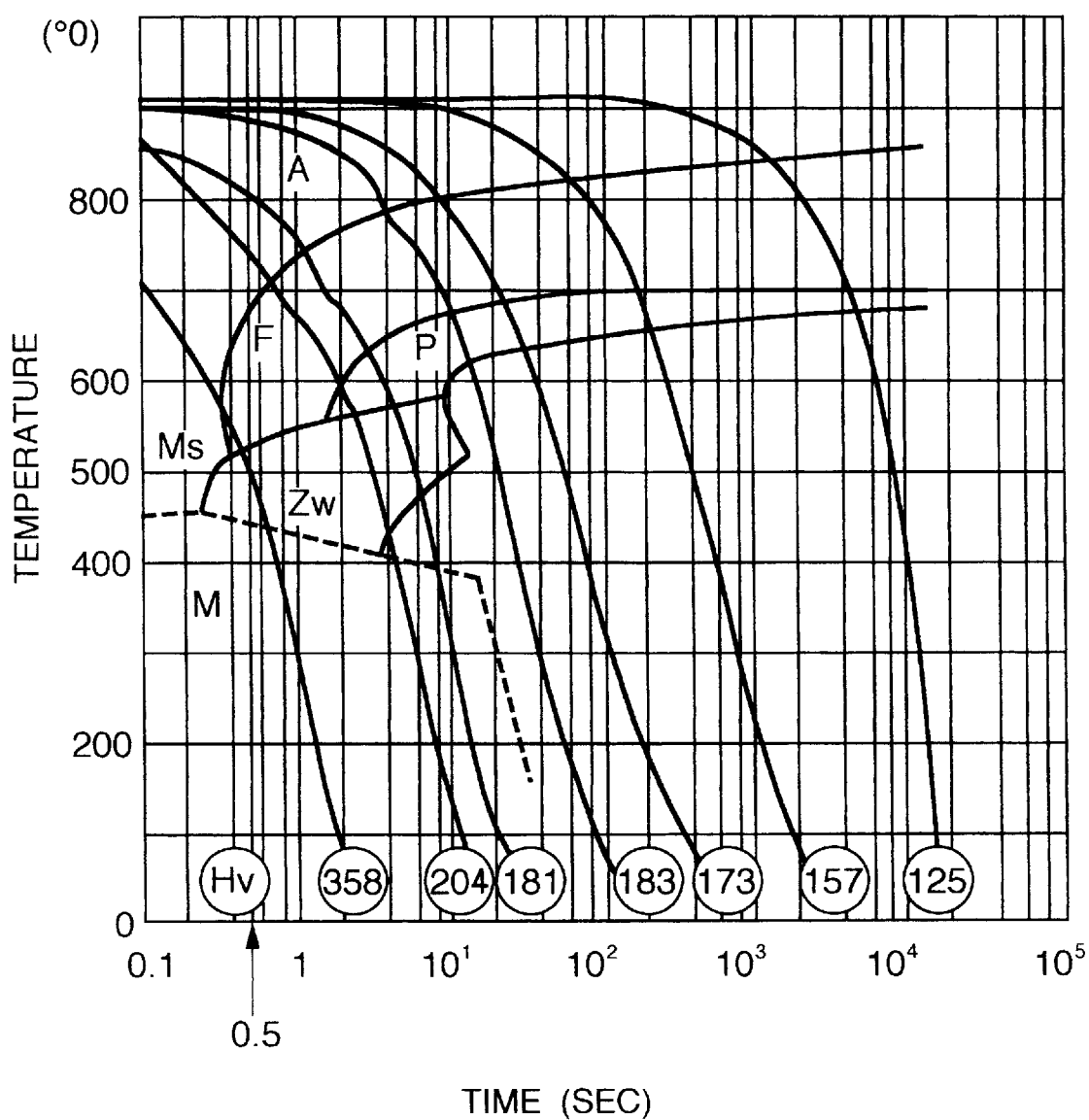
FIG. 6 is a continuous cooling transformation diagram of low carbon steel, the carbon content of which is 0.13 wt %.
Figure 7A:
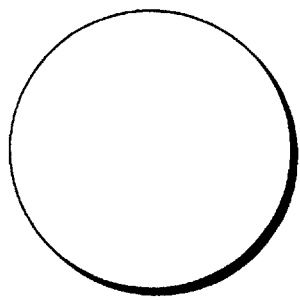
FIGS. 7(a) through 7(f) are manufacturing process drawing of the conventional sprocket.
Figure 7B:
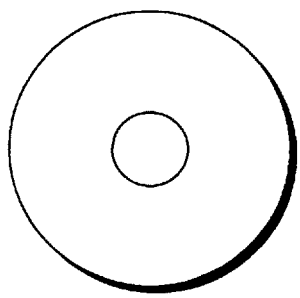
Figure 7C:
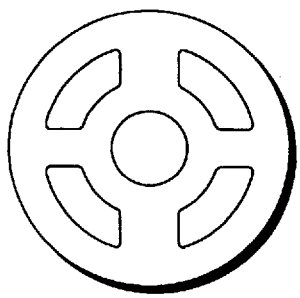
Figure 7D:
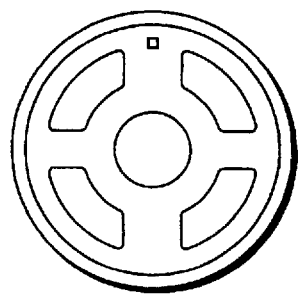
Figure 7E:
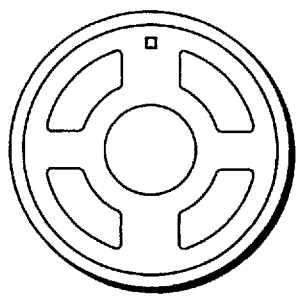
Figure 7F:
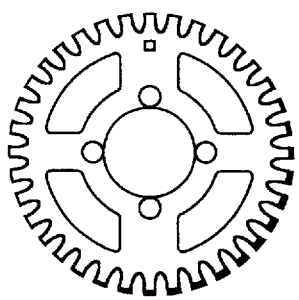
Figure 8G:
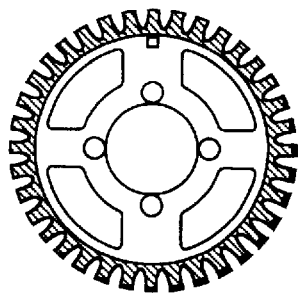
FIGS. 8(g) through 8(j) are a manufacturing process drawing of the conventional sprocket.
Figure 8H:
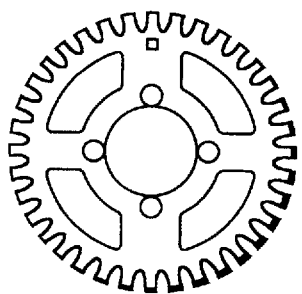
Figure 8I:
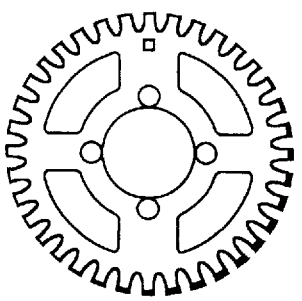
Figure 8J:
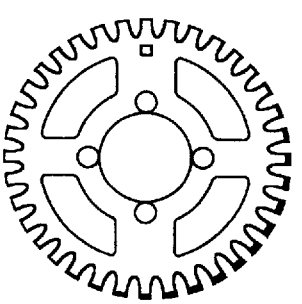

Now, referring to the continuous cooling transformation diagram shown in FIG. 6, the cooling speed of the teeth 4 will be briefly explained below. Concerning the low carbon steel, the carbon content of which is 0.13 wt %, in order to provide the Vickers hardness Hv 358 (in the case of Rockwell hardness C, HRC≈37), it is necessary to quickly cool the low carbon steel from about 720° C. to 500° C. within 0.5 sec. In order to provide 35 to 55 of the Rockwell hardness C, it is necessary to quickly cool the low carbon steel from about 720° C. to a temperature not higher than 500° C. within 0.5 sec.

As another method of quickly cooling to a temperature not higher than 500° C. within 0.5 sec, the teeth 4 may be watered by jet immediately before the stoppage of heating conducted by the high-frequency induction heating device 21. In this case, the occurrence of a gentle temperature drop caused in a period of time from the stoppage of heating to the start of jet-watering the teeth 4 is prevented, so that the teeth 4 can be cooled and quenched more quickly. Alternatively, the sprocket 1 may be dipped and agitated in a solution into which a depressant of freezing point such as salt is added.

Figure 4:
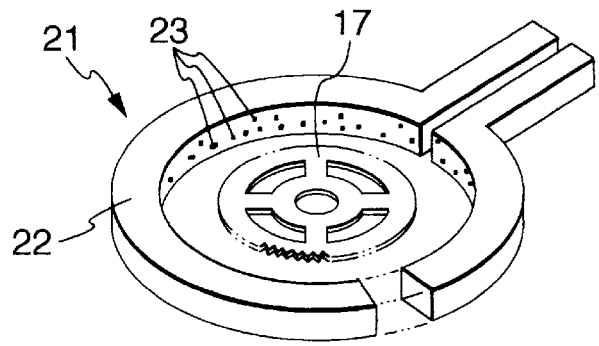
FIG. 4 is a schematic illustration of the high-frequency induction heating device.

As shown in FIG. 4, the high-frequency induction heating device 21 has a common structure including a substantially annular hollow induction coil 22 made of copper which surrounds the sprocket 1. There are formed a plurality of jet holes 23 on the inner circumferential surface of the induction coil 22, and the jet holes 23 are directed to the center of the induction coil 22. When the induction coil 21 is energized with a current of AC, the frequency of which is 30 to 300 KHz, under the condition that the sprocket 1 is set inside the induction coil 21, only the teeth 4 of the sprocket 1 can be quickly heated by means of high-frequency induction heating. When pressurized water is supplied inside the induction coil 21, water can be jetted out from the plurality of jet holes 23 to the teeth 4. Due to the foregoing, the teeth 4 can be quickly cooled. In this connection, another quenching method in which the induction heating coil is used will be described as follows. Under the condition that the induction coil and the sprocket 1 are dipped in water, the teeth 4 of the sprocket 1 are heated to a temperature not lower than the $A_3$ transformation point, and then electric power supply to the induction coil is stopped, so that the sprocket 1 can be quickly cooled.

Figure 3I:
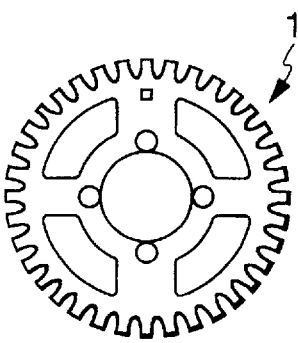

Next, in the surface treatment process shown in FIG. 3(i), the sixth step 16, which has already been quenched, is subjected to plating or coating. In this way, the sprocket 1 can be provided. However, in the case where the sixth step 16 is not subjected to plating or coating, this process can be omitted.

As described above, the sprocket 1 can be manufactured by the manufacturing process essentially composed of 7 processes mainly including press forming. Accordingly, it is possible to greatly simplify the manufacturing process so as to reduce the manufacturing cost. Also, it is possible to enhance the accuracy easily. Further, since teeth cutting is conducted by means of machining, it is possible to effectively prevent the occurrence of cracks of the teeth 4 in the quenching process. Furthermore, after the teeth 4 have been quenched, the hardness is increased to a value of 35 to 55 of the Rockwell hardness C. Accordingly, it is possible to ensure a sufficiently high anti-abrasion property of the teeth 4. Also, it is possible to conduct tempering on the teeth 4 at a low temperature (for example, at about 120° C.) at which the hardness is not lowered.

Next, a quenching test will be explained as follows which was made by the inventors to find out the optimum quenching method.

In this test, the following test pieces A to L were used, the carbon contents of which are shown on Table 1.

TABLE 1

| Test Piece | Carbon Content (wt %) |
| --- | --- |
| A | 0.03 |
| B | 0.04 |
| C | 0.07 |
| D | 0.12 |
| E | 0.13 |
| F | 0.16 |
| G | 0.18 |
| H | 0.24 |
| I | 0.36 |
| J | 0.45 |
| K | 0.47 |
| L | 0.48 |

The following 3 types of quenching methods were employed for the test.

(1) Water Jet Method

In the water jet method, the teeth are heated to a temperature not lower than the $A_3$ transformation point. Simultaneously with the stoppage of heating, the teeth are watered so that the teeth can be quenched.

(2) Water Dipping Method

In the water dipping method, after the teeth have been heated to a temperature not lower than the $A_3$ transformation point, they are dipped in water.

(3) Oil Dipping Method

In the oil dipping method, after the teeth have been heated to a temperature not lower than the $A_3$ transformation point, they are dipped in oil.

Values of the Rockwell hardness C of the quenched test pieces were measured in the test. Result of the measurement is shown in FIG. 5. As can be seen in the diagram shown in FIG. 5, when the test pieces were quenched by the water jet method, the teeth were sufficiently quenched to a hardness close to the theoretical maximum quenching hardness. Even the hardness of the test pieces made of low carbon steel, the carbon contents of which were not less than 0.10 wt %, was not lower than 35 of the Rockwell hardness C. Therefore, it can be understood that these test pieces had a sufficiently high anti-abrasion property.

On the other hand, when the test pieces were quenched by the water dipping method or the oil dipping method, the hardness was not increased to a value close to the theoretical maximum quenching hardness. In the case of low carbon steel, the carbon content of which was not more than 0.20 wt %, the Rockwell hardness C of the teeth was lower than 35. That is, it can be understood that the anti-abrasion property of the teeth was deteriorated.

Although not shown in FIG. 5, except for the above water jet method, there was provided a quenching method in which the test pieces were heated to a temperature not lower than the $A_3$ transformation point and watered by jet immediately before the stoppage of heating. According to this method, the hardness was somewhat increased more than the hardness obtained by the water jet method, and it was found that the same anti-abrasion property as that of the water jet method was positively ensured. In another case, after the test pieces had been heated to a temperature not lower than the $A_3$ transformation point, they were dipped in salt water, and then the salt water was agitated with the test pieces. In this case, although the hardness of the test pieces was somewhat lowered, the same anti-abrasion property as that of the water jet method was ensured. However, when quenching is conducted in salt water, the sprocket surface is corroded. Therefore, it is preferable to conduct cooling more quickly in salt water than a case in which cooling is conducted in water.

According to the present invention, the sprocket is made of inexpensive material. Therefore, it is possible to greatly reduce the cost of manufacturing the sprocket. When the teeth of the sprocket are quenched, the hardness can be increased to a value close to the theoretical maximum quenching hardness. Accordingly, the anti-abrasion property of the teeth can be greatly enhanced. Further, since the sprocket is made of low carbon steel, the carbon content of which is low, it is possible to form a shape of the sprocket from a steel plate mainly by means of press forming or only by means of press forming such as fine blanking. Therefore, it is possible to manufacture an accurate sprocket of high quality by a simplified manufacturing process.

In this case, when the carbon content of a low carbon steel plate is set in a range from 0.10 to 0.20 wt %, it is possible to manufacture a sprocket from a common inexpensive material while the anti-abrasion property of the teeth is maintained at a sufficiently high value. When the teeth are quenched to a hardness of 35 to 55 of the Rockwell hardness C, it is possible to ensure a sufficiently high anti-abrasion property of the teeth. Further, when a ratio of the shearing surface to the inner circumferential surface of the inside diameter mounting hole is set at a value not less than 50%, the assembling accuracy of the sprocket with respect to the rotary shaft can be enhanced.

According to the method of manufacturing a sprocket of the present invention, the sprocket is made of an inexpensive low carbon steel plate, the carbon content of which is not more than 0.25 wt %. Consequently, the cost of manufacturing the sprocket can be greatly reduced. Since the carbon content of material is low, it is possible to form a sprocket from a low carbon steel plate mainly by means of press forming or only by means of press forming. Accordingly, the number of processes to manufacture the sprocket can be reduced. Further, different from machining, errors caused by the abrasion of a cutting tool can be reduced, and it possible to manufacture an accurate sprocket of uniformly high quality. Furthermore, chips are seldom generated in the manufacturing process. Therefore, it is easy to process the generated chips. When the teeth are quickly cooled and quenched from a temperature not lower than $A_3$ transformation point to a temperature not higher than 500° C. within 0.5 sec, the Rockwell hardness C of the teeth is increased to a value close to the theoretical maximum hardness. Accordingly, it is possible to obtain a sprocket having a high anti-abrasion property.

In this case, when the carbon content of a low carbon steel plate is set at 0.10 to 0.20 wt %, it is possible to make a sprocket of a common inexpensive material while the anti-abrasion property of the teeth is maintained high. When the teeth are quenched and the hardness is increased to 35 to 55 of the Rockwell hardness C, it is possible to maintain the anti-abrasion property to be sufficiently high. When a simple method is employed in which the teeth of the sprocket are heated to a temperature not lower than the $A_3$ transformation point and watered by jet and quenched simultaneously with or immediately after the stoppage of heating, it is possible to quickly cool the teeth from a temperature not lower than the $A_3$ transformation point to a temperature of 500° C. within 0.5 sec. The teeth may be watered by jet immediately before the stoppage of heating, so that the teeth can be quenched. In this case, the occurrence of a gentle temperature drop caused in a period of time from the stoppage of heating to the start of jet-watering the teeth is prevented, so that the teeth can be cooled and quenched more quickly.

When the teeth of a sprocket are cut by means of machining in the manufacturing process, the occurrence of cracks of the teeth can be positively prevented, so that the fraction defective can be lowered. When the teeth of a sprocket are heated by a high-frequency induction heating device in the quenching process, it is possible to quickly heat only the teeth to a predetermined temperature.

We claim:

1. A sprocket made of low carbon steel set at 0.10 to 0.20 wt % in the carbon content, comprising:
    a teeth portion which is quenched to a hardness close to a theoretical maximum quenching hardness, the theoretical maximum quenching hardness being the maximum Rockwell hardness C value known for a particular carbon content; and an inside diameter mounting hole, wherein said teeth portion is quenched to 35–55 in the Rockwell hardness C.

2. The sprocket of claim 1, wherein a ratio of the shearing surface to the inner circumferential surface of said inside diameter mounting hole is not less than 50%.

3. A method of manufacturing a sprocket, comprising the steps of:

machining a low carbon steel plate, the carbon content set at 0.10 to 0.20 wt %, into a shape of a sprocket; and quenching a teeth portion of said machined sprocket by heating to a temperature not lower than the $A_3$ transformation point and quickly cooling to a temperature lower than 500° C. within 0.5 sec so as to quench said teeth portion to a hardness close to a theoretical maximum quenching hardness, the theoretical maximum quenching hardness being the maximum Rockwell hardness C value known for a particular carbon content.

wherein said teeth portion is quenched to 35–55 in the Rockwell hardness C.

4. The method of manufacturing a sprocket of one of claim 1, wherein said teeth portion of said machined sprocket is heated to a temperature not lower than the $A_3$ transformation point and watered simultaneously with or immediately after the stoppage of heating in the quenching process so as to quench said teeth portion.

5. The method of manufacturing a sprocket of claim 3, wherein said teeth portion of said machined sprocket is heated to a temperature not lower than the $A_3$ transformation point and watered immediately before the stoppage of heating in the quenching process so as to quench said teeth portion.

6. The method of manufacturing a sprocket of claim 3, wherein a shape of said sprocket is formed from a low carbon steel plate only by means of press forming in the manufacturing process.

7. The method of manufacturing a sprocket of claim 3, wherein at least said teeth portion of said sprocket is machined in the manufacturing process.

8. The method of manufacturing a sprocket of claim 3, wherein said teeth portion of said sprocket is heated by a high-frequency induction heating device in the quenching process.

\* \* \* \* \*